United States Patent
Keselman et al.

(10) Patent No.: US 11,373,372 B2
(45) Date of Patent: Jun. 28, 2022

(54) AUTOMATIC DYNAMIC DIAGNOSIS GUIDE WITH AUGMENTED REALITY

(71) Applicant: FANUC AMERICA CORPORATION, Rochester Hills, MI (US)

(72) Inventors: Leo Keselman, Ferndale, MI (US); Yi Sun, West Bloomfield, MI (US); Sai-Kai Cheng, Rochester Hills, MI (US); Jason Tsai, Bloomfield Hills, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 0 days.

(21) Appl. No.: 16/453,749

(22) Filed: Jun. 26, 2019

(65) Prior Publication Data
US 2019/0392644 A1   Dec. 26, 2019

Related U.S. Application Data

(60) Provisional application No. 62/690,045, filed on Jun. 26, 2018.

(51) Int. Cl.
*G06T 19/00* (2011.01)
*G06N 5/02* (2006.01)
(Continued)

(52) U.S. Cl.
CPC ........... *G06T 19/006* (2013.01); *B25J 9/1674* (2013.01); *G02B 27/017* (2013.01);
(Continued)

(58) Field of Classification Search
CPC ...... B25J 9/1674; G02B 27/017; G02B 27/01; G06K 7/1417; G06K 9/00671;
(Continued)

(56) References Cited

U.S. PATENT DOCUMENTS 8,418,001 B2   4/2013   Knörl et al.
9,472,028 B2   10/2016   Abdel-Rahman et al.
(Continued)

FOREIGN PATENT DOCUMENTS

WO   2017153005 A1   9/2017

OTHER PUBLICATIONS

NPL : Google: mitsubishi servo system family catalog in pdf ; https://www.oaaust.com/Melservo%20General%20Brochure.pdf , Mitsubish , Oct. 2013 (Year: 2013).*
(Continued)

*Primary Examiner* — Ming Wu
(74) *Attorney, Agent, or Firm* — John A. Miller; Shumaker, Loop & Kendrick, LLP (57) ABSTRACT

An augmented reality (AR) system for diagnosis, troubleshooting and repair of industrial robots. The disclosed diagnosis guide system communicates with a controller of an industrial robot and collects data from the robot controller, including a trouble code identifying a problem with the robot. The system then identifies an appropriate diagnosis decision tree based on the collected data, and provides an interactive step-by-step troubleshooting guide to a user on an AR-capable mobile device, including augmented reality for depicting actions to be taken during testing and component replacement. The system includes data collector, tree generator and guide generator modules, and builds the decision tree and the diagnosis guide using a stored library of diagnosis trees, decisions and diagnosis steps, along with the associated AR data.

24 Claims, 7 Drawing Sheets

(51) Int. Cl.
  *G07C 3/00* (2006.01)
  *G06K 9/00* (2022.01)
  *G06K 7/14* (2006.01)
  *B25J 9/16* (2006.01)
  *G02B 27/01* (2006.01)
  *G07C 3/08* (2006.01)
  *G06V 20/20* (2022.01)

(52) U.S. Cl.
  CPC ........... *G06K 7/1417* (2013.01); *G06N 5/022* (2013.01); *G06V 20/20* (2022.01); *G07C 3/005* (2013.01); *G07C 3/08* (2013.01)

(58) Field of Classification Search
  CPC ........ G06N 5/022; G06N 5/003; G06N 5/041; G06T 19/006; G07C 3/005; G07C 3/08; G05B 2219/39412
  See application file for complete search history.

(56) References Cited

U.S. PATENT DOCUMENTS

| | | | |
|---|---|---|---|
| 9,870,716 B1* | 1/2018 | Rao | G09B 19/0092 |
| 9,922,236 B2* | 3/2018 | Moore | G06F 3/011 |
| 2012/0007852 A1 | 1/2012 | Morate et al. | |
| 2013/0218783 A1 | 8/2013 | Anand | |
| 2014/0310595 A1 | 10/2014 | Acharya et al. | |
| 2015/0164430 A1 | 6/2015 | Hu et al. | |
| 2016/0253563 A1 | 9/2016 | Lam et al. | |
| 2017/0301261 A1 | 10/2017 | Robitzkat et al. | |
| 2017/0360412 A1* | 12/2017 | Rothberg | G06T 7/0012 |
| 2018/0103917 A1 | 4/2018 | Kim et al. | |
| 2018/0125584 A1 | 5/2018 | Lang | |
| 2018/0165978 A1* | 6/2018 | Wood | G09B 5/02 |

OTHER PUBLICATIONS

Riccardo Palmarini, John Ahmet Erkoyuncu, Rajkumar Roy, Hosein Torabmostaedi; A systematic review of augmented reality applications in maintenance; Robotics and Computer-Integrated Manufacturing vol. 49, Feb. 2018, pp. 215-228; https://www.sciencedirect.com/science/article/abs/pii/S0736584517300686#fig0003.

Jerermy Pollard; Control Design for Machine Builders; Augmented reality lets the equipment help you diagnose the problem; Mar. 30, 2016; https://www.controldesign.com/articles/2016/augmented-reality-lets-the-equipment-help-you-diagnose-the-problem/.

TechSee Intelligent Visual Assistance; TechSee Live Field Services Smart Assistance for Things; TechSee Augmented Vision, Ltd.

PCT International Search Report of the International Searching Authority dated Sep. 2, 2019 and dated Sep. 24, 2019 for International Application No. PCT/US2019/039340 filed Jun. 26, 2019.

* cited by examiner

FIGURE 7

AUTOMATIC DYNAMIC DIAGNOSIS GUIDE WITH AUGMENTED REALITY

CROSS-REFERENCE TO RELATED APPLICATIONS

This application claims the benefit of the priority date of U.S. Provisional Patent Application Ser. No. 62/690,045, titled AUTOMATIC DYNAMIC DIAGNOSIS GUIDE WITH AUGMENTED REALITY, filed Jun. 26, 2018.

BACKGROUND

Field

This invention relates to the field of robot troubleshooting and diagnosis and, more particularly, to a system for quickly and efficiently diagnosing a problem with an industrial robot which collects data from the robot controller, identifies an appropriate diagnosis decision tree based on the collected data, and provides an interactive step-by-step troubleshooting guide to a user on a mobile device, including augmented reality for depicting actions to be taken during testing and component replacement.

Discussion of the Related Art

Industrial robots are very complex machines which are capable of performing many different functions precisely and reliably. However, when a problem occurs in a robot, it can be difficult to determine the root cause and correct the problem.

Currently there are several obstacles in the way of fast alarm diagnosis, including: troubleshooting is not well documented; existing troubleshooting documentation is spread out among various manuals; manuals are not quickly and easily accessible by the customer; many alarms can have multiple root causes, and working through all of them can waste time, effort, and cost without providing the solution; and the troubleshooting instructions can be difficult to execute due to the complexity of controller and robot hardware. Furthermore, customers typically do not have a high level of expertise in robot troubleshooting and repair.

Other existing diagnostic systems require that a user watch a video or listen to an audio recording with instructions about diagnosing the problem. This requires the user to look first at a screen on a computing device and then to the real system, which requires extra time. Moreover, if the video or audio doesn't describe the exact system or problem the user is working on but some variant, the user may become confused.

In light of the circumstances described above, it is desired to provide an interactive tool for quickly and efficiently guiding a user through the troubleshooting process to get the robot back in operation as soon as possible.

SUMMARY

In accordance with the teachings of the present disclosure, an augmented reality system for diagnosing a problem indicated by an alarm code on a robot is disclosed. The disclosed diagnosis guide system communicates with a controller of an industrial robot and collects data from the robot controller. The system then identifies an appropriate diagnosis decision tree based on the collected data, and provides an interactive step-by-step troubleshooting guide to a user on a mobile device, including augmented reality for depicting actions to be taken during testing and component replacement. The system includes data collector, tree generator and guide generator modules, and builds the decision tree and the diagnosis guide using a stored library of decisions and diagnosis steps, along with the associated AR data.

Additional features of the presently disclosed devices will become apparent from the following description and appended claims, taken in conjunction with the accompanying drawings.

DETAILED DESCRIPTION OF THE EMBODIMENTS

The following discussion of the embodiments of the disclosure directed to a method and system for automatic troubleshooting and diagnosis of industrial robots using augmented reality is merely exemplary in nature, and is in no way intended to limit the disclosed devices and techniques or their applications or uses.

Due to the complexity and flexibility of robot systems, alarms can be notoriously difficult to understand and troubleshoot. There are many examples of simple problems taking a long time to fix due to lack of understanding of the customer and poor documentation. A system which makes alarm diagnosis efficient and user-friendly would be valuable for any robot customer, especially with an emphasis on general industry. Whereas robot customers in some industries such as automotive have resources to employ robot experts and the experience of many years dealing with robots, general industry customers may not have this luxury and will likely find alarm troubleshooting intimidating. An interactive diagnosis guide system would be an attractive feature for these customers just starting in robotic applications.

Recognizing the need described above, an improved system has been developed to provide fast and efficient troubleshooting of a problem with an industrial robot. The diagnosis guide system collects data from a robot controller, identifies an appropriate diagnosis decision tree based on the collected data, and provides an interactive step-by-step troubleshooting guide to a user on a mobile device, including augmented reality for depicting actions to be taken during testing and component replacement.

A mobile application ("app") is designed to be the customer interface to the diagnosis guide system. Through the mobile app, the customer is able to select a controller that needs a diagnosis and the application provides a systematic tutorial for how to diagnose the alarm. The guide includes an interactive step-by-step walkthrough with diagrams, pictures, and videos. In addition, an Augmented Reality (AR) enabled device is able to overlay relevant data and highlight parts in the real world. Depending on the capabilities of the device, the user may be able to get the multimedia diagnosis guide only (without AR), or the user may be able to make use of the AR features as well.

Figure 1:
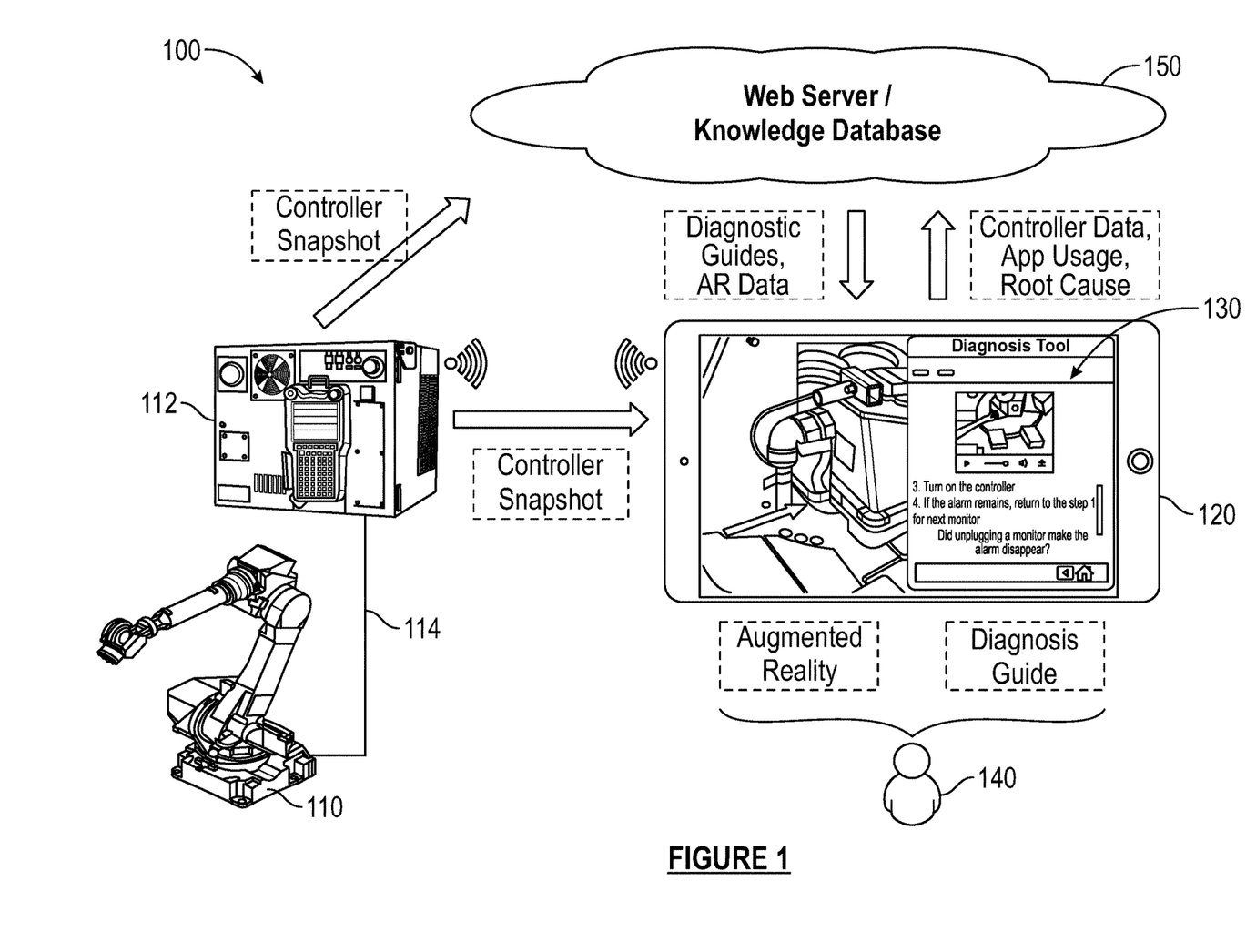
FIG. 1 is an illustration of a system for automatic guided diagnosis of robot trouble codes using augmented reality, according to an embodiment of the present disclosure.

FIG. 1 is an illustration of a system 100 for automatic guided diagnosis of robot trouble codes using augmented reality, according to an embodiment of the present disclosure. An industrial robot 110 communicates with a robot controller 112, typically via a cable 114, as is known in the art. The robot 110 may be any type of industrial robot—such as a welding robot, a painting robot, or a robot configured and programmed to perform any other task. Because of the complexity of the robot 110 and the sometimes extreme environments in which they work, problems occur from time to time. Many different types of alarms and information signals (visual, audible, display screen messages, and combinations thereof) could be provided by the robot or the robot controller to indicate a problem, and each of these results in a trouble code or alarm code or data message which identifies the problem and which is used as the basis of the diagnosis process. The alarms or trouble codes are indicated by the controller 112, and may require either immediate attention or attention sometime soon.

When the alarm or trouble code is indicated by the controller 112, a mobile device 120 running a diagnosis guide app 130 may be used to diagnose and resolve the trouble code. At this point, the robot 110 has stopped running its motion program, and the robot 110 and the controller 112 are in a mode where diagnosis and troubleshooting can be performed. A "snapshot" of controller data is provided from the controller 112 to the mobile device 120 for use by the app 130. The data is preferably provided over a wireless communication connection—which may be made possible by both the controller 112 and the mobile device 120 wirelessly communicating with a local area network (LAN), for example. The controller snapshot includes all data related to the performance of the robot 110 which may be relevant to the diagnosis and troubleshooting. This data will include the alarm or trouble code identifier, which identifies the type of problem to which the code applies (such as a joint motor problem). The snapshot data may also include time history data and maximum value data for parameters such as joint loads and torques, motor currents, etc.

Using the controller snapshot data (if available), the diagnosis guide app 130 prepares a diagnosis guide with optional augmented reality (AR) content for use by a user 140. The user 140 answers questions and performs diagnosis steps, and the diagnosis guide progressively leads the user 140 to the next question or step in a diagnosis tree. The AR content (if available) is used to clearly show the user 140 how to identify a particular part on the robot 110, or perform a certain action (such as unplugging a cable or replacing a part). The AR feature allows the user 140 to aim the camera of the mobile device 120 at a part of the robot 110, and the AR content (such as highlighting and other virtual graphics) are overlaid on the camera images of the real world view. Ultimately, an action will be taken which resolves the trouble code, the root cause will be recorded in the app 130, and the robot 110 will be placed back in service.

The user's actions in the guide and information downloaded from the controller 112 can then flow to a web server or other server having a knowledge database (indicated as cloud 150), such that the data can be aggregated and analyzed for potential future improvements to the diagnosis or other information. The diagnosis guide app 130 can also upgrade itself with the latest guides and information by downloading items from the server/database in the cloud 150. The controller 112 may also be in communication directly with the server/database in the cloud 150 using communication infrastructure clearly understood by those skilled in the art, such as the controller 112 being connected to a LAN which in turn has Internet connectivity.

The process followed by a user is essentially as follows; using the diagnosis guide app 130, identify a robot controller from a list, upon which the diagnosis guide app 130 will download a controller data "snapshot"; identify an alarm condition being experienced by the controller (which may be performed automatically based on the controller snapshot); and follow steps as instructed in the user guide, including answering questions, performing diagnostic tests, and replacing components as necessary.

The output of the diagnosis guide app 130 is a guide instructing the user what steps to take and what information to observe, to get to the root cause of the alarm. The guide may have diagrams, photos, or videos as appropriate and will ask questions from the user to decide how best to proceed. The guide may also include AR data which will highlight items and information in the real world on a live feed (in the case of tablet or phone) or as a hologram (in the case of an AR headset).

Figure 2:
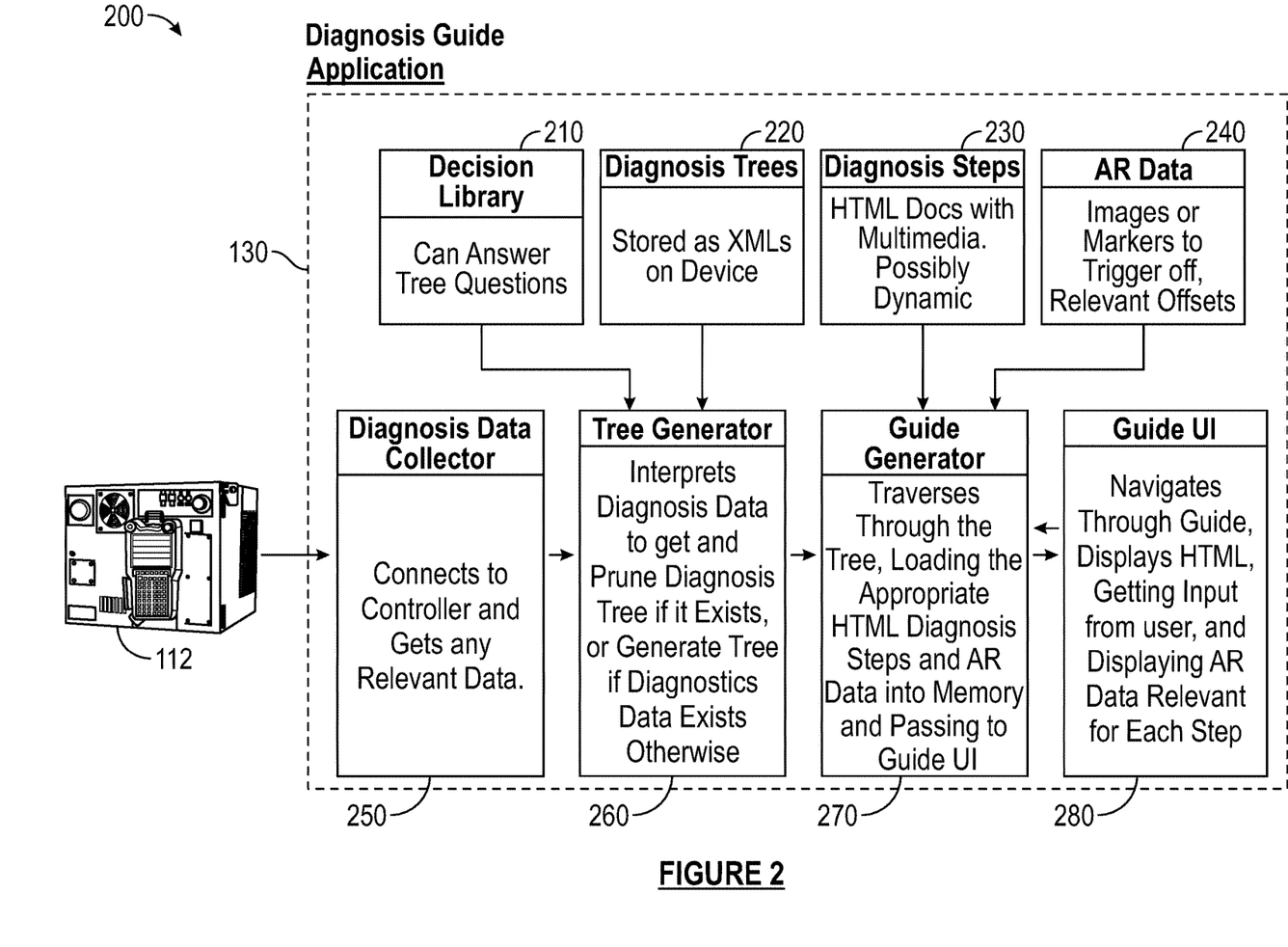
FIG. 2 is an architecture diagram showing the modules of the automatic guided diagnosis application of FIG. 1, according to an embodiment of the present disclosure.

FIG. 2 is an architecture diagram 200 showing the modules of the diagnosis guide application 130 of FIG. 1, according to an embodiment of the present disclosure. As discussed above, the diagnosis guide app 130 preferably receives a "snapshot" from the controller 112. The controller snapshot includes data recorded by the controller 112 describing recent operating conditions in the robot 110. The diagnosis guide app 130 can be used without the controller snapshot data, in which case the user 140 begins by indicating what alarm or trouble code was indicated by the controller 112, and then following the diagnosis tree presented by the app 130. However, the controller snapshot data is helpful in providing data about the robot 110 which can expedite the troubleshooting and diagnosis, and the snapshot data is normally available for download to the diagnosis guide app 130 on the mobile device 120.

The architecture of the diagnosis guide app 130 calls for each supported problem to be represented by a diagnosis tree. Information about the state of the actual system to be diagnosed (from the controller snapshot) as well as user responses to questions determine the user's path through the tree to an ultimate diagnosis. The architecture includes data libraries separate from software modules, where this design allows supported fault conditions to be added or modified in the data libraries without requiring software module changes. Moreover, the architecture allows the diagnosis guide app 130 to be executable on many different types of devices by encapsulating communication and guide display features.

A decision library 210 includes many different decision points and automatic decision functions which may be used in diagnosis trees. A diagnosis tree library 220 includes a diagnosis tree for each supported alarm or trouble code. A diagnosis steps library 230 includes many different diagnosis steps which may be used in the diagnosis trees. An AR data library 240 includes augmented reality (AR) data files which may be associated with diagnosis steps or decision points when presenting the steps to the user. Each of the items in the libraries 210-240 is contained in a file (such as XML or HTML), and will be discussed further below.

Figure 3:
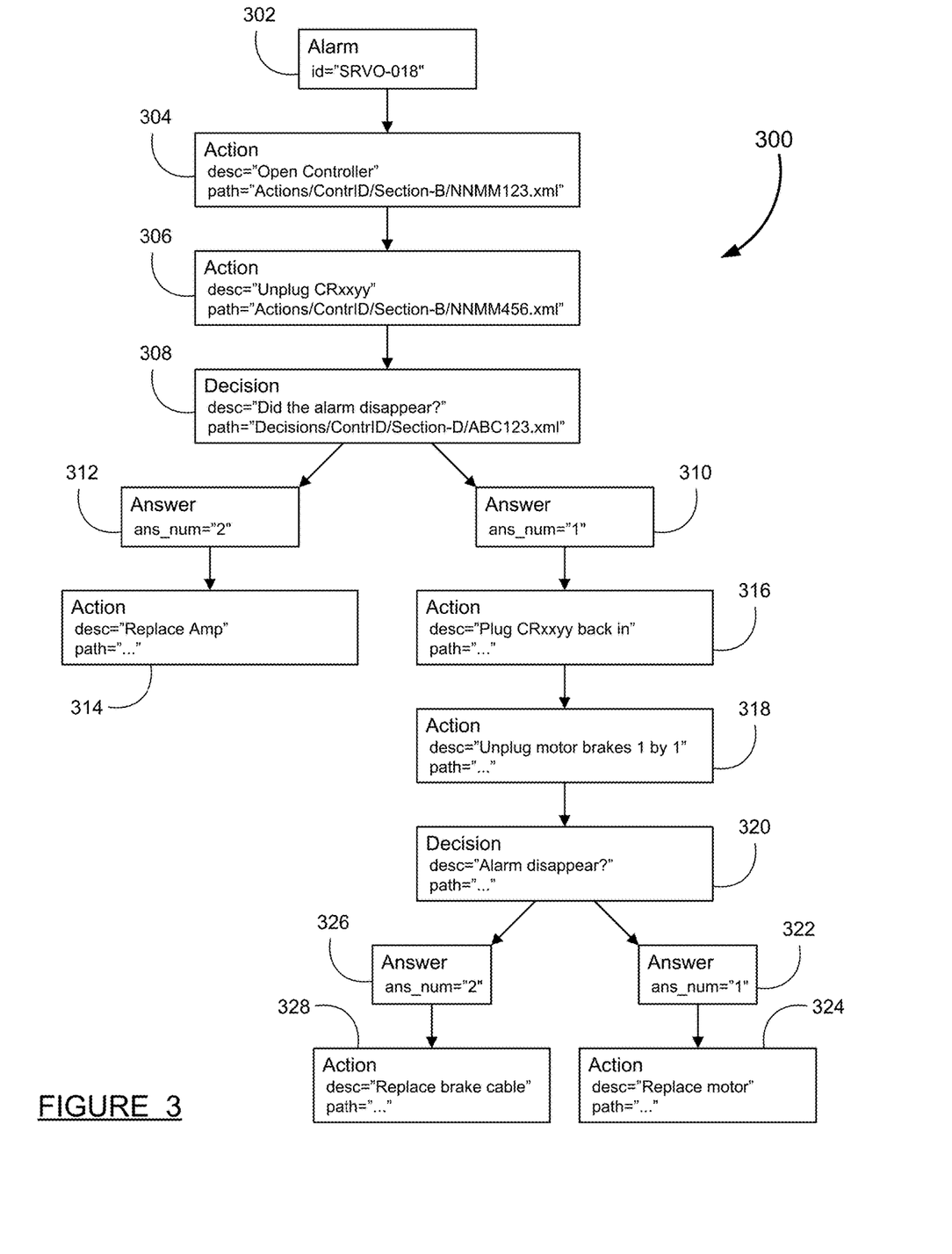
FIG. 3 is a block diagram illustrating a diagnosis tree from the automatic guided diagnosis application architecture of FIG. 2, according to an embodiment of the present disclosure.

FIG. 3 is a block diagram illustrating a diagnosis tree 300 from the diagnosis tree library 220 of the diagnosis guide application architecture of FIG. 2, according to an embodiment of the present disclosure. The diagnosis tree 300 is an example diagnosis tree for a supported fault condition for the diagnosis guide app 130. Each diagnosis tree is contained in an XML file in the tree library 220. The diagnosis trees are created by expert service technicians of the robot manufacturer. Each diagnosis tree is made up of nodes each having only one parent. There are four different types of nodes, each discussed below.

A root node 302 designates the supported fault condition which is being diagnosed. The root node 302 is the starting point for the diagnosis, based on a particular alarm or trouble code. The diagnosis tree 300 is uniquely defined for the particular alarm or trouble code identified in the root node 302.

An action node (or Diagnosis Step) 304 is an example of a step in the diagnosis where a user is asked to perform a diagnosis step relevant to the problem, such as unplugging a cable or replacing a component. The actions can have associated guide instructions as well as augmented reality data. Each action node (or diagnosis step) is contained in an HTML or XML document in the diagnosis steps library 230, where the document may contain multimedia (audio &/or video), and may also have linked AR data. Each action in the diagnosis steps library has a description and a path identifier which uniquely identifies the document in the diagnosis steps library 230. An action node (such as the node 304) may lead to another action node (node 306), or an action node may lead to a decision point (such as a decision node 308), where these relationships are defined in the structure of the decision tree 300.

Diagnosis steps are discrete actions taken as part of the diagnosis. Each diagnosis step is an atomic unit, able to be re-used in multiple different diagnosis trees (i.e., for different alarms or trouble codes). The diagnosis steps are manifested as HTML documents (web pages) and can include pictures, animated pictures (gifs), videos, and text, which explain clearly how to perform the step.

Certain steps in the diagnosis tree will have AR data associated with them. This AR data will essentially identify what information to overlay, what real-world objects (robot components) to anchor on, and what shapes to draw to call the user's attention to certain areas on the robot where an action needs to be performed.

The decision node 308 is an example of a point in the diagnosis where a user is asked to answer a question, or alternatively the system automatically answers the question based on data from the controller snapshot. Decision points determine which of the two or more paths is followed and therefore the path taken through the diagnosis tree 300 in a particular diagnosis session. Each decision node is contained in an XML document in the decision library 210. Decision nodes may have yes/no answers, or may have multiple choice answers, where the output path is dependent upon the answer. In the diagnosis tree 300, the decision node 308 is shown with two possible answers (answer node 310 and answer node 312). FIG. 3 shows the decision node 308 and the answer nodes 310 and 312 each as a node; however, in a flowchart diagram, these would typically be combined and displayed as a decision diamond.

A leaf node represents the final determined cause of the fault condition, and is a node with no children. In the diagnosis tree 300, action nodes 314, 324 and 328 are leaf nodes, where each of the leaf nodes is reached via a different route or path through the tree 300. Specifically, from the decision node 308, an answer of Yes (2) at the node 312 leads to the action node 314 as the leaf node. On the other hand, an answer of No (1) at the node 310 leads to action nodes 316 and 318 followed by decision node 320, where an answer of No at node 322 leads to the action leaf node 324, and an answer of Yes at node 326 leads to the action leaf node 328.

Each alarm or trouble code supported by the diagnosis guide app 130 has a corresponding diagnosis tree similar to the diagnosis tree 300. An expert technician or customer support representative creates the tree structure, using decisions contained in the decision library 210 and diagnosis steps (actions) contained in the diagnosis steps library 230. Each tree contains all of the possible steps needed to diagnose the alarm. Starting from the root of the tree, the progression through the tree to get to the final cause can vary depending on decision points. The tree is pruned as much as possible, before being presented to the user in the diagnosis guide app 130, using the controller snapshot data.

Figure 4:
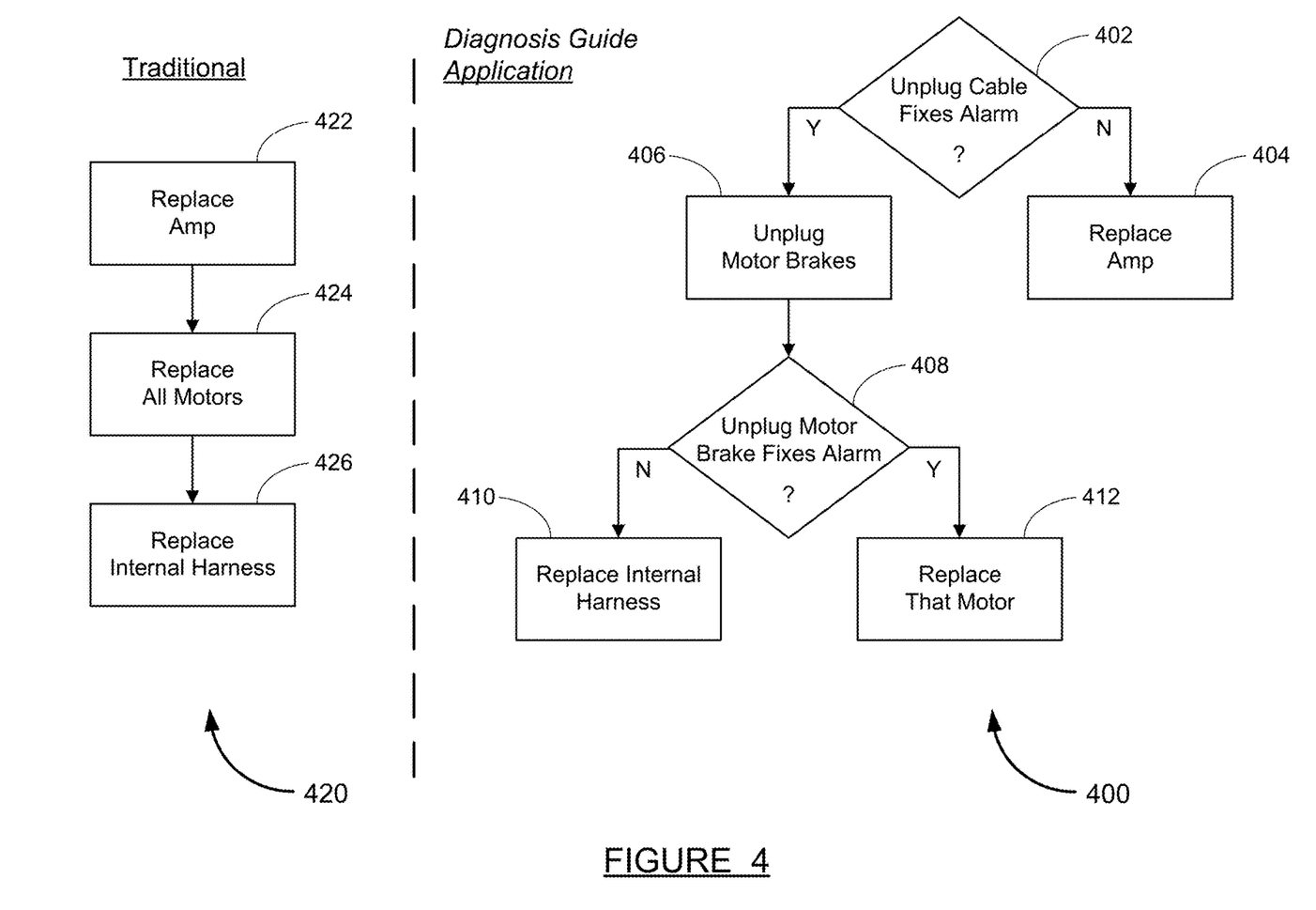
FIG. 4 is a block diagram comparing a partial diagnosis tree from the application architecture of FIG. 2 with a traditional straight-through part replacement approach.

FIG. 4 is a block diagram comparing a partial diagnosis tree from the application architecture of FIG. 2 with a traditional straight-through part replacement approach. Shown at 400 is an example of a partial diagnosis tree from the diagnosis guide app 130. Using this approach, answers to decision points 402 and 408 dictate the subsequent steps, which may include an intermediate action node 406 and ultimately leading to a leaf action node 404, 410 or 412. In the diagnosis guide app 130, the interactive diagnosis tree leads the user through a sequence of tests and component replacements which can more quickly identify and correct the root cause, without the time and expense of replacing components which are not the cause of the problem. This approach results in the components only being replaced when that particular component is likely the root cause of the alarm code, as indicated by previous diagnosis steps.

Shown at 420 is an example of a traditional straight-through part replacement approach. In the traditional approach, components are replaced one at a time at boxes 422, 424 and 426 until the problem is solved, where the replacement order may be based on what is most likely to solve the problem or easiest to perform. The traditional approach, used before the availability of the diagnosis guide app 130, often results in a lengthy diagnosis process and robot components being replaced unnecessarily.

Figure 5:
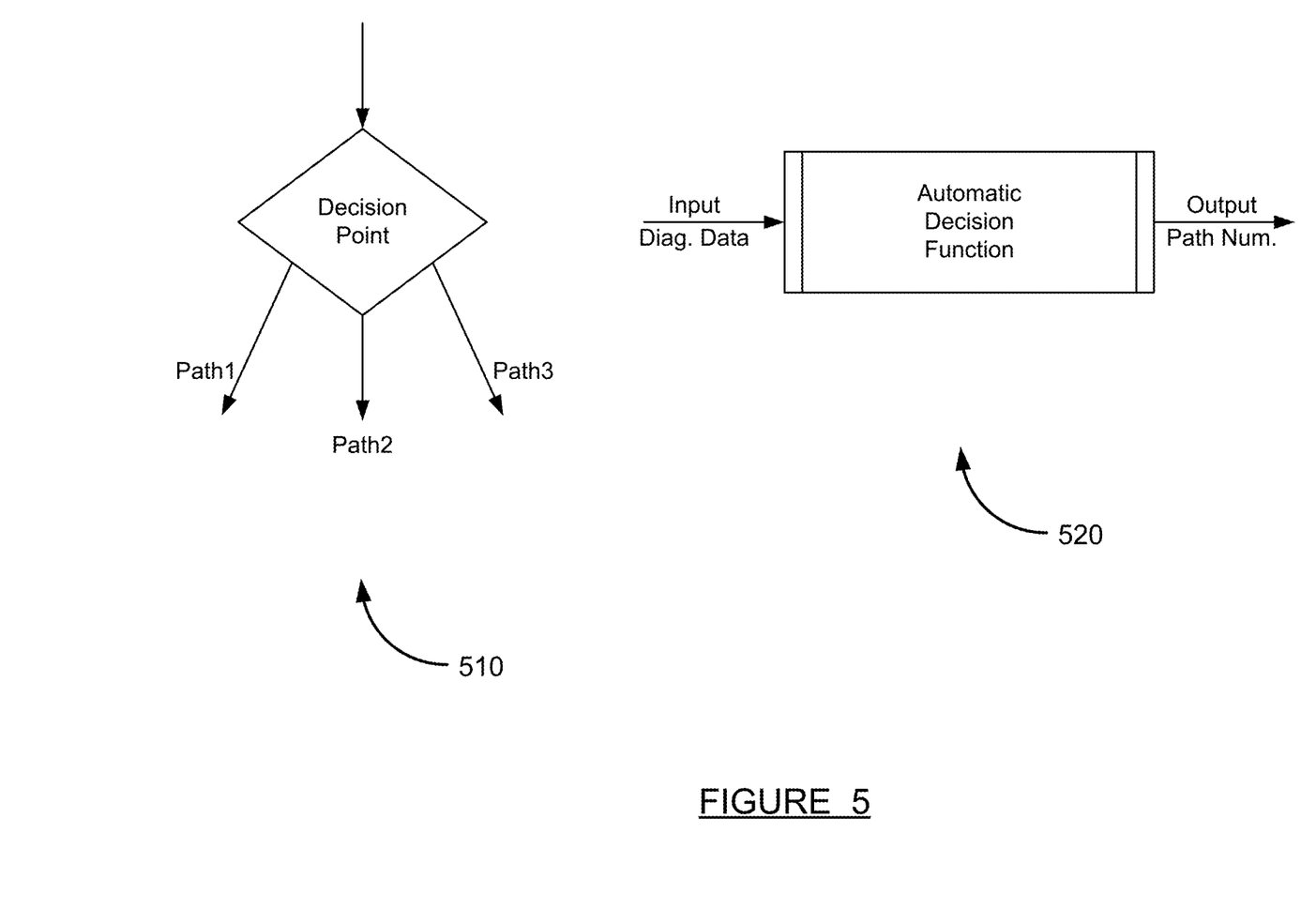
FIG. 5 is an illustration of decision library components from the application architecture of FIG. 2, according to an embodiment of the present disclosure.

FIG. 5 is an illustration of decision library components from the decision library 210 of the application architecture of FIG. 2, according to an embodiment of the present disclosure. A decision point 510 is a point where the decision tree branches based on the user's answer to a question. The decision point 510 is shown as having three possible answers, where each answer leads down to different path in the decision tree. Each path may lead to another decision point, or to an action (diagnosis step). Decision points in the decision library commonly have two possible answers (such as yes or no), each leading to a different path.

An automatic decision function 520 is a function embedded in a decision tree which is automatically evaluated based on data from the controller snapshot. The automatic decision function 520 is not presented to the user. Instead, the diagnosis guide app 130 automatically evaluates the automatic decision function 520 either before the decision tree is presented to the user (in which case the tree is pruned based on the automatic decision function 520) or during the user's interaction with the app 130 (in which case a next decision or action is presented to the user based on the resulting output path). Automatic decision functions may have two or more possible output paths depending on the input diagnosis data.

Figure 6:
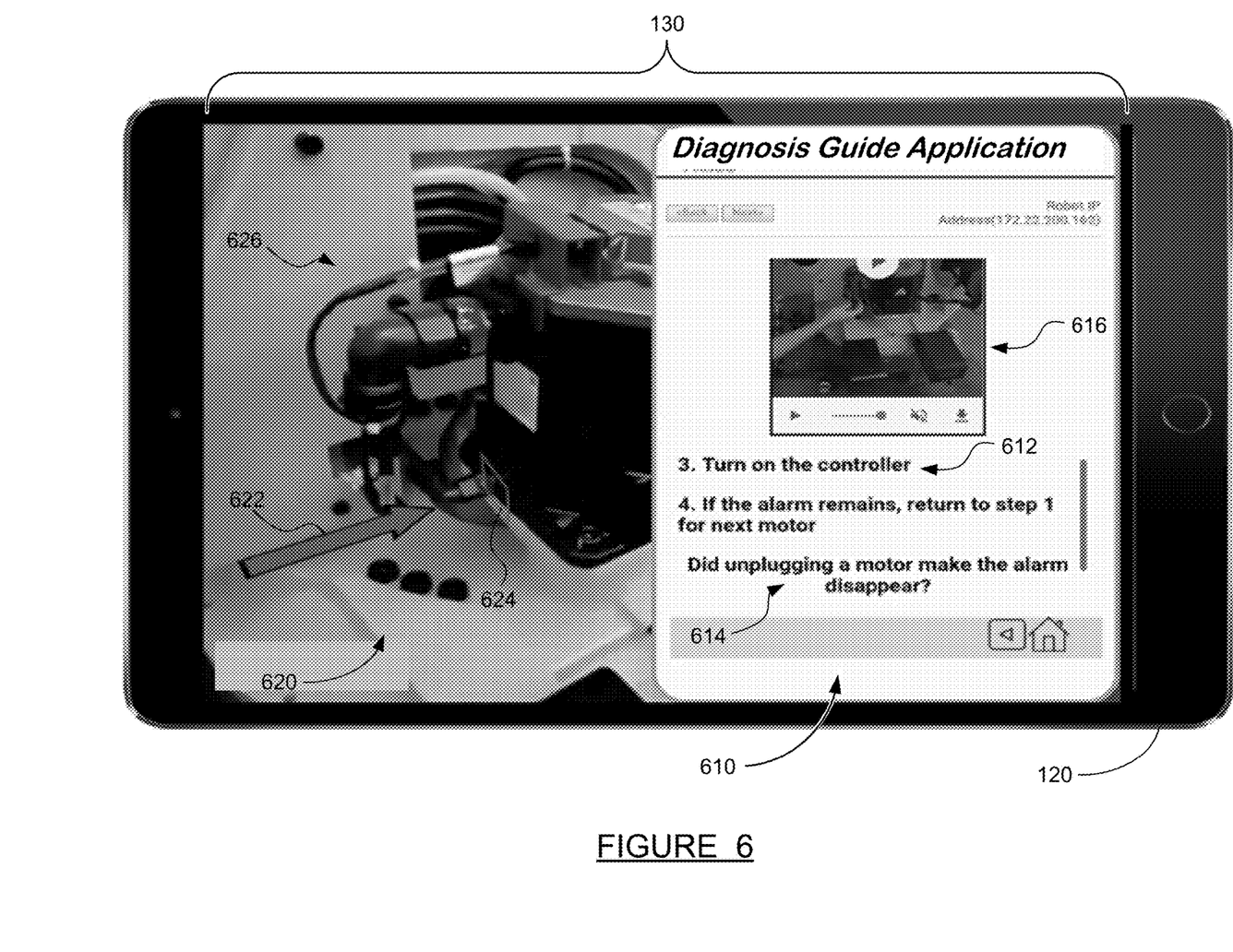
FIG. 6 is an illustration of the diagnosis guide application displaying a diagnosis step (action) and a decision point (question) to a user, along with a supporting augmented reality (AR) display, according to an embodiment of the present disclosure.

FIG. 6 is an illustration of the diagnosis guide app 130 displaying a diagnosis step (action) and a decision point (question) to a user, along with a supporting augmented reality (AR) display, according to an embodiment of the present disclosure. The diagnosis guide app 130 appears on the screen of the mobile device 120, as explained previously. The diagnosis guide app 130 is divided in split-screen fashion into a user dialog section 610 on the right and an AR display 620 on the left. The user may select, or the app 130 may automatically determine, what portion of the screen to use for the user dialog section 610 and the AR display 620. For example, the user dialog section 610 may occupy 100% of the display screen when no AR data is available, and the user dialog section 610 may be shrunk to only 10% of the display screen when the AR display 620 is actively being used by the user. For situations where the mobile device 120 is a headset-type AR apparatus, the user dialog section 610 may be "parked in space" for viewing, while the real-world elements and the virtual elements are viewed in the AR display 620 which occupies the entire viewing area.

The user dialog section 610 includes a combination of diagnosis steps (actions) and a decision point (question). As shown in FIG. 6, a previously-performed diagnosis step is indicated at 612, and a decision point (question) is indicated at 614. The user dialog section 610 also includes an encapsulated video window 616, where a video is displayed which depicts the current step that the user is being instructed to perform (such as unplugging a motor). The window 616 may include pictures, illustrations, animated illustrations (GIFs), videos, or other media. The diagnosis steps (actions) and decision point (question) displayed in the user dialog section 610 are part of a diagnosis tree as shown in FIG. 3 and discussed earlier. Based on the answer to the question 614, the diagnosis tree will move along a path to the appropriate node, and the action or decision associated with that node will be displayed in the user dialog section 610.

In addition to the video window 616, an AR display 620 is shown in the diagnosis guide app 130 of FIG. 6. As mentioned earlier, some diagnosis steps (actions) and decision points (questions) have associated AR data. The AR display 620 is designed to provide interactive visualization assistance which is helpful to the user in completing the diagnosis step. The AR display 620 includes a virtual feature display 622, which is an arrow illustrating a direction of motion or a direction of viewing, and a virtual feature display 624, which is an outline indicating a location of a part on the robot. The virtual feature displays 622 and 624 are overlaid on images 626 of the real-world scene (the robot and surroundings) as viewed by the camera of the mobile device 120. The virtual feature displays 622 and 624 are computed by the processor in the mobile device 120 and displayed in the proper size and orientation based on the position and orientation of the mobile device 120 relative to the robot. The position and orientation of the mobile device 120 relative to the robot (or the robot work cell) may be determined by analyzing images of a visual marker in the work cell, and continuously tracked via visual and/or inertial odometry techniques, as would be understood by one skilled in AR technology. The mobile device 120 may be a tablet computing device, a smart phone, or an AR headset/goggles apparatus.

Returning to the architecture diagram 200 of FIG. 2, the data libraries 210-240 have been discussed above and their contents illustrated in FIGS. 3-5. The data libraries 210-240 may be updated on an ad hoc basis; that is, elements within the data libraries 210-240 may be added or updated whenever a new version of the element is available. For example, a new diagnosis tree may be created for an alarm or trouble code which was previously unsupported, or AR data may be added for a particular diagnosis step. When this new AR data is available on the web server in the cloud 150, it will be downloaded to the mobile device 120 and added to the AR data library 240 in the app 130. Additions and updates to the data libraries 210-240 do not require software upgrades.

The diagnosis guide app 130 also includes software modules 250, 260, 270 and 280. The software modules 250-280 are updated when a new version of the diagnosis guide app 130 is released, in which case the new version of the app 130 may be downloaded from the web server in the cloud 150. The data libraries 210-240 communicate with the software modules 250-280 as shown in FIG. 2 and discussed below.

The diagnosis guide app 130 includes a diagnosis data collector module 250 which serves as the data download interface to the robot controller 112. The data collector module 250 establishes communication with the controller 112 and requests and receives the controller snapshot data. The snapshot data, including the alarm or trouble code and all relevant data, is stored in memory on the mobile device 120, and is available to and used by the diagnosis guide app 130 as discussed below.

The user 140 starts the diagnosis by identifying the controller 112 which needs to be diagnosed. If a connection to the faulted controller 112 is possible, the app 130 downloads a controller snapshot from the controller 112. The controller snapshot contains data that may help to diagnose the alarm. This could include: alarm history, servo status, system variables, special trend data, and more. The generation and downloading of the snapshot is automatic and invisible to the user.

The diagnosis data collector module 250 communicates to the controller 112 using any appropriate method (USB drive, direct hard-wire connection, connection to a common LAN, etc.), where the preferred method is a wireless connection.

The diagnosis data collector module 250 requests servo diagnostics, and collects any other files from the controller 112 that may help with alarm diagnosis. The diagnosis data collector module 250 parses relevant data from the snapshot file(s) and puts everything into an internal diagnosis data structure available to and used by the diagnosis guide app 130.

The diagnosis guide app 130 also includes a tree generator module 260. The tree generator module 260 retrieves a diagnosis tree from the diagnosis tree library 220 for the particular alarm or trouble code, if it is available. The tree generator module 260 parses the diagnosis tree XML data and makes an internal tree structure for the particular trouble code. The tree generator module also "prunes" the diagnosis tree based on diagnosis data received from the controller in the data collector module 250. For example, automatic decision functions may be called, and data from the controller snapshot used, to decide how to build the rest of the tree, where one or more branches of the tree can be pruned off based on the automatic decision function.

If the diagnosis guide app 130 is not able to acquire diagnosis data via the controller snapshot, no questions are answered automatically and instead each decision point in the diagnosis tree becomes a potential question to the user 140. In this case, the user 140 simply enters the alarm or trouble code identifier, and the diagnosis guide app 130 retrieves the appropriate diagnosis tree from the diagnosis tree library 220.

In addition, if a diagnosis tree does not exist for a particular alarm or trouble code, but statistical diagnostic data does exist (indicating statistical percentages of different root causes for the trouble code), then a diagnosis tree is constructed by the tree generator module 260 as a chain of actions in order of highest probability of solving the problem. If statistical diagnostic data does not exist or is ambiguous, actions may ordered in the chain of actions based on time to perform the step, where steps with the shortest time to perform are ordered first. When a "tree" is constructed as a chain of actions, the diagnosis guide app 130 still serves as a useful tool, asking the user to replace the most likely components in order until one fixes the alarm. These component replacement steps may still offer augmented reality (AR) assistance, even in the absence of a diagnosis tree.

If neither a diagnosis tree nor statistical diagnostic data exist for a particular alarm or trouble code, then the tree generator module 260 of the diagnosis guide app 130 returns a message indicating this status to the user 140. In such a case, the need for the creation of a diagnosis tree for the particular alarm or trouble code may be recorded on the web server in the cloud 150, so that service technicians at the robot manufacturer can create and distribute such a diagnosis tree in the near future. Also, if the diagnosis guide app 130 is not able to provide a diagnosis to the alarm (no diagnosis tree and no statistical diagnostic data is available), the app 130 allows the user 140 to submit pictures, video, and controller snapshots for analysis by an expert technician. The user 140 simply presses a button within the app 130 to package the images and data and submit them to an email address or web server location where a customer service representative reviews the data and responds to the user 140 with assistance.

The diagnosis guide app 130 further includes a guide generator module 270. The guide generator module 270 receives the decision tree generated by the tree generator module 260, whether that tree was retrieved from the diagnosis tree library 220 or the tree was built by the tree generator module 260 based on the statistical diagnostic data. The guide generator module 270 traverses through the diagnosis tree, loading the appropriate diagnosis steps (from the diagnosis steps library 230) and AR data (from the AR data library 240) to create a complete diagnosis guide based on the diagnosis tree.

The diagnosis guide app 130 additionally includes a guide user interface (UI) module 280. The guide UI module 280 receives the fully fleshed-out guide from the guide generator module 270 and presents the diagnosis guide to the user on the mobile device 120. The guide UI module 280 also receives the user's answers to questions and provides the answers to the guide generator module 270 so that the appropriate subsequent node can be presented to the user by the guide UI module 280.

As mentioned above, it is sometimes necessary to create a new diagnosis tree which addresses an alarm or trouble code which was not previously supported. To do this, the technician starts by creating a diagnosis tree for the particular alarm. Many actions and decision points needed in the new diagnosis tree may already exist in the decision library 210 and the diagnosis step library 230. For any new actions, new HTML pages are generated, and new AR data where appropriate. For any new decision points, a new XML is needed defining the question to ask and possible answers. If an automatic decision is possible, a new function must be written defining how to answer the question based on diagnosis data. If additional diagnostic data is needed, software modifications are needed to the diagnosis data collector to parse additional data and add it to the internal data structure.

Figure 7:
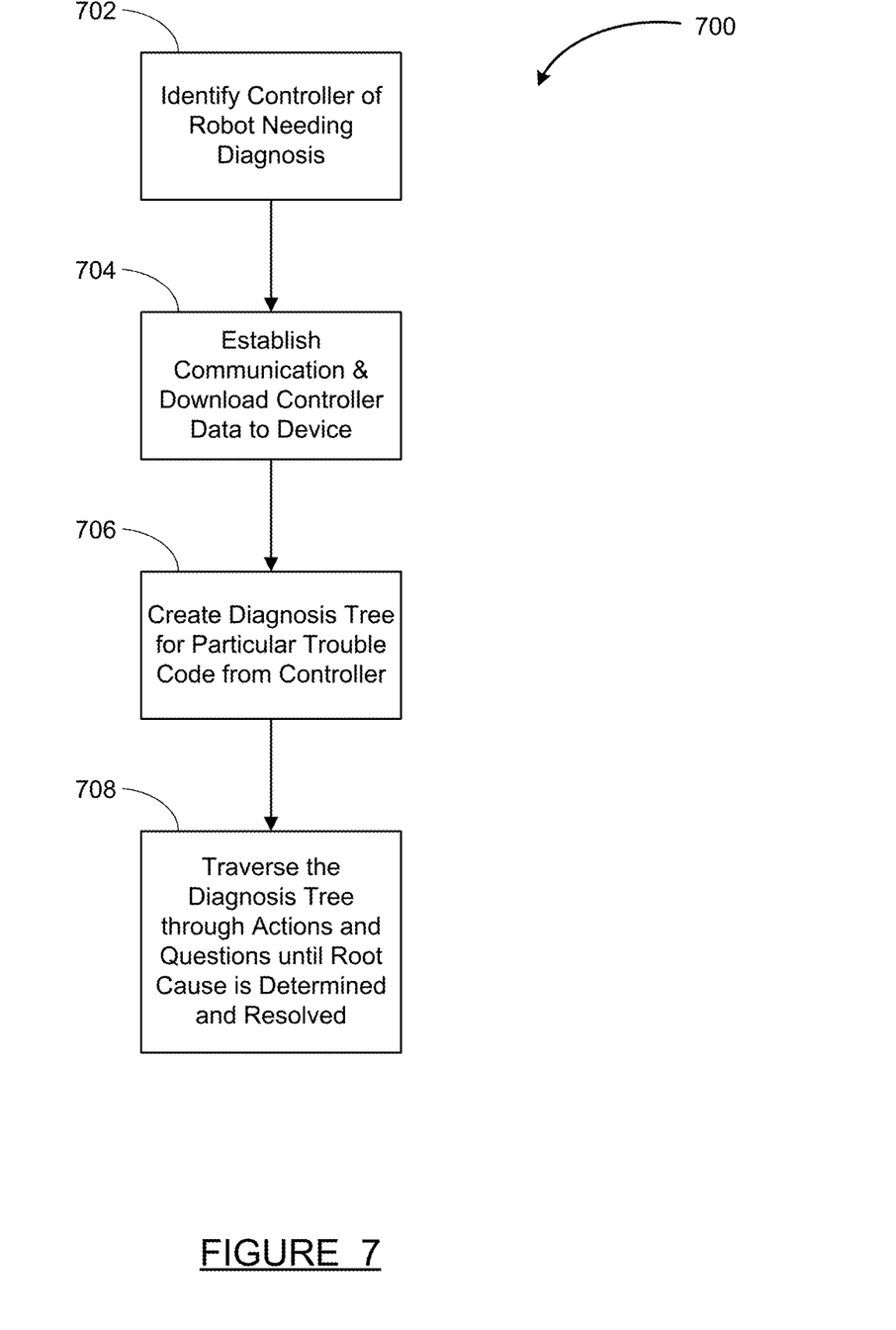
FIG. 7 is a flowchart diagram of a method for automatic guided diagnosis of robot trouble codes using augmented reality, employing the system of FIG. 1, according to an embodiment of the present disclosure.

FIG. 7 is a flowchart diagram of a method for automatic guided diagnosis of robot trouble codes using augmented reality, employing the system of FIG. 1, according to an embodiment of the present disclosure. At box 702, a controller of a robot needing diagnosis is identified. The robot in question typically will have stopped operating and the controller will be displaying an alarm condition or trouble code. At box 704, communications are established between the identified controller and a mobile device (preferably AR-capable) running the diagnosis guide application, and a "snapshot" of controller data is downloaded from the controller to the device running the diagnosis guide app.

At box 706, a diagnosis tree is created for the particular trouble code identified by the controller. Creating the diagnosis tree includes selecting an existing diagnosis tree from a diagnosis tree library if one exists, or building a diagnosis tree based on statistical root cause data if the diagnosis tree library does not contain a diagnosis tree for the particular trouble code. Creating the diagnosis tree also includes pruning the tree (selecting some paths and eliminating others) based on automatic decision functions in the tree which are evaluated using data from the controller snapshot.

At box 708, the diagnosis tree is interactively traversed, including displaying a diagnosis guide including diagnosis steps for the user to perform and questions for the user to answer, where the answers to the questions determine which path to follow in the diagnosis tree. The diagnosis tree is traversed at the box 708 until a root cause of the trouble code is determined and resolved through performance of the diagnosis steps. Traversing the diagnosis tree includes providing pictures, descriptions and video to the user, where any or all of these forms of media may be used to explain and illustrate to the user what action needs to be taken, how to do it, and where to find the particular item(s) on the robot or the controller. An AR display may also be provided, in addition to the other forms of media, where the AR display provides virtual overlays such as pointers and highlighters on top of images of the real-world scene, and the AR display allows the user to move around to different points of view while properly portraying the virtual overlay items.

Slightly different user experiences are provided depending on whether the mobile device is a tablet computing device (where a split screen may be used for the AR display and the user dialog section) or an AR headset apparatus (where the entire viewing area may be the AR display, with the user dialog section being "parked in space" for the user to view and interact with).

The diagnosis guide application on the mobile device may communicate with a web server or knowledge database "in the cloud"—either for real-time creation of a diagnosis tree after capturing the controller snapshot, or for periodic updates to available diagnosis trees and steps, AR data, etc. which are stored in libraries in the application.

Throughout the preceding discussion, various controllers are described and implied—for controlling motions and tasks of a robot, for running the diagnosis guide application on the mobile device, etc. It is to be understood that the software applications and modules of these controllers are executed on one or more computing devices having a processor and a memory module, including algorithms configured in non-volatile memory. In particular, this includes processors in the robot controller 112 and the mobile device 120 discussed above. The communication between the robots, their controllers and the mobile device may be over a hard-wire network, or may use any suitable wireless technology—such as a cellular phone/data network, Wi-Fi, Bluetooth, broadband Internet, etc.

As outlined above, the disclosed techniques for an automatic robot diagnosis guide with augmented reality offer several advantages over prior art techniques. The ability of a user to easily and intuitively perform diagnosis steps and answer questions, with embedded pictures, descriptions, videos and augmented reality views of the robot and other real-world items, is far superior to prior iterative techniques for sequentially replacing components.

While a number of exemplary aspects and embodiments of the method and system for automatic robot alarm diagnosis using augmented reality have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A system for diagnosing and repairing a problem with a machine, said system comprising:
   a machine controller in communication with a machine, said controller including a processor and memory and being configured with machine control software for controlling operation of the machine and recording trouble codes for the machine; and
   an augmented reality (AR) device, said AR device having one or more cameras, position tracking sensors and a display, said AR device further including a processor and memory configured to run a diagnosis guide software application;
   where the diagnosis guide software application provides features including;
   providing data from the machine controller to the AR device including data indicating a problem with the machine;
   establishing and continuously tracking a position and orientation of the AR device relative to a work cell coordinate frame;
   creating a diagnosis tree including diagnosis steps and decision points which will diagnose a root cause of the problem; and
   providing a diagnosis guide which traverses the diagnosis tree by interacting with a user at the diagnosis steps and the decision points until the root cause of the problem is determined and resolved.

2. The system according to claim 1 wherein the AR device is a headset apparatus worn by a user.

3. The system according to claim 2 wherein a portion of the diagnosis tree including the pictures, videos and descriptions are displayed in a user dialog window which is positioned at a fixed location in space for viewing by the user.

4. The system according to claim 1 wherein the AR device is a smart phone or a tablet computing device held by a user, and an AR display and a user dialog window are displayed in a split screen mode.

5. The system according to claim 1 wherein establishing the position and orientation of the AR device relative to the work cell coordinate frame includes analyzing images of a visual marker having a known design and placed at a known location in the work cell coordinate frame.

6. The system according to claim 1 wherein providing data from the machine controller includes establishing communications between the AR device and the controller and downloading data about the machine including alarm history, robot joint loads and torques, servo motor status, motor currents, and trend data.

7. The system according to claim 1 wherein providing data from the machine controller includes generating and displaying a two-dimensional barcode (QR code) by the machine controller and reading the QR code by the AR device, where the QR code identifies the trouble code.

8. The system according to claim 1 wherein creating a diagnosis tree includes selecting a diagnosis tree previously created for the problem from a diagnosis tree library and, when a diagnosis tree for the problem does not exist in the diagnosis tree library, constructing the diagnosis tree as a chain of actions including replacing machine components in order of likelihood of resolving the problem.

9. The system according to claim 1 wherein creating a diagnosis tree includes pruning the tree by automatically answering questions at one or more decisions points using the data from the machine controller.

10. The system according to claim 1 wherein the user guide presents the diagnosis steps with pictures, videos, descriptions and AR data designed to assist the user in completing the diagnosis steps, asks the user to answer a question at each of the decision points, and follows a branch of the tree based on the answer.

11. The system according to claim 1 wherein the position tracking sensors include one or more gyroscopes and one or more accelerometers, where the sensors provide signals to the processor in the AR device enabling continuous computation of changes in position and orientation of the AR device.

12. The system according to claim 11 wherein the AR data includes virtual features superimposed on camera images of the machine, where the virtual features are designed to provide visual assistance to the user in completing the diagnosis steps, and display of the virtual features is continuously updated based on the changes in position and orientation of the AR device.

13. The system according to claim 1 further comprising a web server including a knowledge database, where the AR device communicates with the web server and downloads diagnosis trees and AR data from the knowledge database, and uploads root cause information to the knowledge database.

14. The system according to claim 1 wherein the machine is an industrial robot.

15. An apparatus for diagnosing and repairing a problem with an industrial robot, said apparatus comprising an augmented reality (AR) device in communication with a robot controller, said AR device having one or more cameras, inertial sensors and a display, said AR device further including a processor and memory configured to run a diagnosis guide software application, where the diagnosis guide software application is configured to download data from the robot controller including data indicating a problem with a robot, create a diagnosis tree including diagnosis steps and decision points which will diagnose a root cause of the problem, and provide a diagnosis guide which traverses the diagnosis tree by interacting with a user at the diagnosis steps and the decision points until the root cause is resolved.

16. A method for diagnosing and repairing a problem with a machine, said method comprising:
    providing a machine and a machine controller in communication with the machine,
    providing an augmented reality (AR) device, said AR device having one or more cameras, position tracking sensors and a display, said AR device further including a processor and memory configured to run a diagnosis guide software application;
    establishing and continuously tracking a position and orientation of the AR device relative to a work cell coordinate frame;
    providing machine diagnostic data from the machine controller to the AR device, including data identifying a problem with the machine;
    determining a diagnosis tree based on the diagnostic data, where the diagnosis tree includes diagnosis steps and decision points which will diagnose a root cause of the problem;
    presenting a diagnosis guide to a user of the AR device, where the diagnosis guide follows the diagnosis tree; and
    following the diagnosis guide, by the user, until the root cause of the problem is identified and corrected, including performing testing and component replacement actions at the diagnosis steps and answering questions at the decision points.

17. The method according to claim 16 wherein presenting the diagnosis guide to the user includes providing AR data on the AR device, said AR data depicting at least one testing or component replacement activity which is included in the diagnosis tree.

18. The method according to claim 17 wherein the AR device is a headset apparatus worn by the user, where the AR data is superimposed on real-time images of the machine and its surroundings, and where a portion of the diagnosis tree including pictures, videos and descriptions are displayed in a user dialog window which is positioned at a fixed location in space for viewing by the user.

19. The method according to claim 18 wherein the AR data includes virtual features superimposed on the real-time images of the machine, where the virtual features are designed to provide visual assistance to the user in completing the diagnosis steps, and display of the virtual features is continuously updated based on changes in position and orientation of the AR device.

20. The method according to claim 16 wherein determining a diagnosis tree includes selecting a diagnosis tree previously created for the problem from a diagnosis tree library or, when a diagnosis tree for the problem does not exist in the diagnosis tree library, constructing the diagnosis tree as a chain of actions including replacing machine components in order of likelihood of resolving the problem.

21. The method according to claim 16 wherein determining a diagnosis tree includes pruning the tree by automatically answering questions at one or more decisions points using the diagnostic data from the machine controller.

22. The method according to claim 16 further comprising communicating with a web server including a knowledge database, by the AR device, including downloading diagnosis trees and AR data from the knowledge database, and uploading root cause information to the knowledge database.

23. The method according to claim 16 wherein the machine is an industrial robot.

24. The method according to claim 16 wherein the data identifying a problem with the machine is an alarm code or a trouble code.

* * * * *